W. H. STEVENS.
Sand-Band for Hubs.

No. 221,256.  Patented Nov. 4, 1879.

UNITED STATES PATENT OFFICE.

WILLIAM H. STEVENS, OF MENDON, MICHIGAN.

IMPROVEMENT IN SAND-BANDS FOR HUBS.

Specification forming part of Letters Patent No. 221,256, dated November 4, 1879; application filed September 9, 1879.

*To all whom it may concern:*

Be it known that I, WILLIAM H. STEVENS, of Mendon, in the county of St. Joseph and State of Michigan, have invented certain new and useful Improvements in Sand-Bands; and I do hereby declare the following to be a full, clear, and exact description of the invention, such as will enable others skilled in the art to which it pertains to make and use it, reference being had to the accompanying drawings, which form part of this specification.

My invention relates to an improvement in sand-bands for hubs; and it consists in a sand-band projecting from the hub, combined with a detachable metallic block, having one or more grooves in its edge, one of which grooves is so shaped at its lower ends as to carry the dust or dirt that may get into it to the outer end of the band, as will be more fully described hereinafter.

Figure 1:
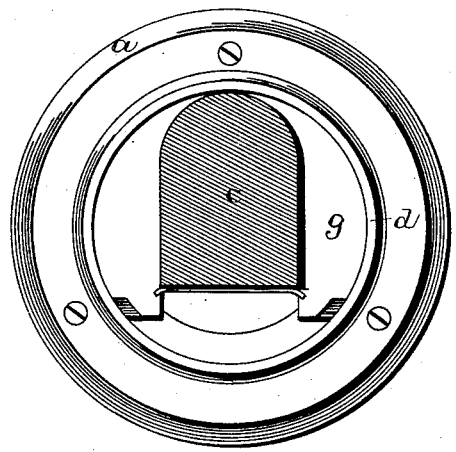
Figure 2:
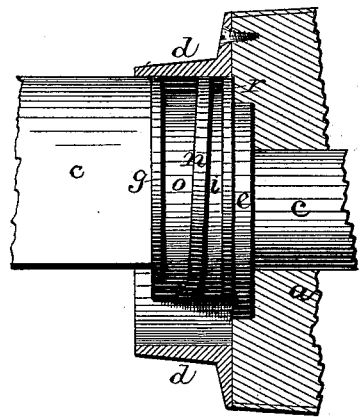

Figure 1 is an end view of the hub, showing the block in position. Fig. 2 is a side view of the block on the axle.

$a$ represents the hub, $c$ the axle, and $d$ the band, which keeps sand, dust, and dirt from getting into the hub.

Just back of the shoulder $e$ on the axle is placed the block $g$, which is just wide enough to snugly fill the band $d$ at all points except at the bottom, where the block is cut away, as shown. In the edge of this block are formed the two grooves $i$ $o$, the inner one of which is considerably widened out at its lower ends, owing to the flange $n$ being turned outward.

The inner flange, $r$, is perfectly straight, and serves to prevent the oil from the hub from working over against the central flange, and from getting into the outside groove.

The outside groove is inclined outward from the hub at its lower ends, so that any sand that may get into the groove will fall freely downward outside of the hub, and not be kept therein for a moment.

Were it not for the inner flange, $r$, the grease would work over the central flange, $n$, and thus keep the outer groove constantly moist, and cause the sand to stay in the groove instead of falling out at once.

Between the axle and the block is placed a strip of rubber, leather, or other material, for the purpose of holding the block in place so that it will not rattle, and between the two ends of the block is placed a flat spring or plate for keeping the block from becoming displaced.

Having thus described my invention, I claim—

1. A block for sand-bands, having a groove, $o$, in its surface, and which is turned outward at its lower ends, so as to carry the sand outside of the hub, in combination with the hub-band $d$, substantially as shown.

2. The block $g$, having the flanges $n$ $r$ and grooves $i$ $o$, in combination with the hub-band $d$, substantially as described.

In testimony that I claim the foregoing I have hereunto set my hand this 26th day of August, 1879.

WILLIAM H. STEVENS.

Witnesses:
 CHAS. H. LEWIS,
 A. H. ESTES.